(12) United States Patent
Akagawa et al.

(10) Patent No.: US 7,716,417 B2
(45) Date of Patent: May 11, 2010

(54) METHOD AND SYSTEM FOR CONTROLLING ACCESS TO TAPE MEDIA FROM A PLURALITY OF VIRTUAL COMPUTERS

(75) Inventors: Etsutaro Akagawa, Kawasaki (JP); Takahiro Nakano, Yokohama (JP); Koji Sonoda, Sagamihara (JP)

(73) Assignee: Hitachi, Ltd. (JP)

( * ) Notice: Subject to any disclaimer, the term of this patent is extended or adjusted under 35 U.S.C. 154(b) by 419 days.

(21) Appl. No.: 11/521,692

(22) Filed: Sep. 15, 2006

(65) Prior Publication Data
US 2008/0022038 A1 Jan. 24, 2008

(30) Foreign Application Priority Data
Jul. 24, 2006 (JP) ............................. 2006-200479

(51) Int. Cl.
*G06F 12/00* (2006.01)

(52) U.S. Cl. ..................... 711/111; 711/154; 711/163; 714/10; 714/12

(58) Field of Classification Search ................. 711/111
See application file for complete search history.

(56) References Cited

U.S. PATENT DOCUMENTS 6,425,059 B1 * 7/2002 Basham et al. .............. 711/153
6,820,168 B2 * 11/2004 Tanaka et al. .................. 711/6
2002/0144069 A1 * 10/2002 Arakawa et al. ............ 711/162

FOREIGN PATENT DOCUMENTS

| JP | 2000-276406 | 10/2000 |
| JP | 2004-206221 | 7/2004 |

OTHER PUBLICATIONS

Skardal, Harald, et al., "NDMP Version 4 Protocol Draft Specification," Apr. 2003, pp. 1-255, Network Working Group.

* cited by examiner

*Primary Examiner*—Brian R Peugh
*Assistant Examiner*—Kalpit Parikh
(74) *Attorney, Agent, or Firm*—Sughrue Mion, PLLC

(57) ABSTRACT

A tape library comprises: a plurality of tape media; a plurality of slots in which the plurality of tape media are respectively stored; a drive in which a tape medium extracted from any of the plurality of slots is set and which performs tape reading or writing in respect of this tape medium; and a controller by which a tape medium is extracted from a designated slot of these plurality of slots and set in the drive. The host computer comprises: a plurality of virtual computers; a first storage region in which is stored slot allocation information expressing which slot is allocated to which virtual computer; and an access control unit that specifies the slot allocated to a first virtual computer, of the plurality of the virtual computers, from the slot allocation information, and restricts access from the first virtual computer to the tape medium in the specified slot.

17 Claims, 16 Drawing Sheets

| VIRTUAL COMPUTER NAME (135) | SLOT NUMBER (140) |
|---|---|
| GUEST OS 1 | 1,2 |
| GUEST OS 2 | 3,4 |
| ... | ... |

| DRIVE NAME (145) | CONDITION (150) |
|---|---|
| DRIVE 1 | GUEST OS 1 IN USE |
| DRIVE 2 | FREE |
| DRIVE 3 | FREE |
| ... | ... |

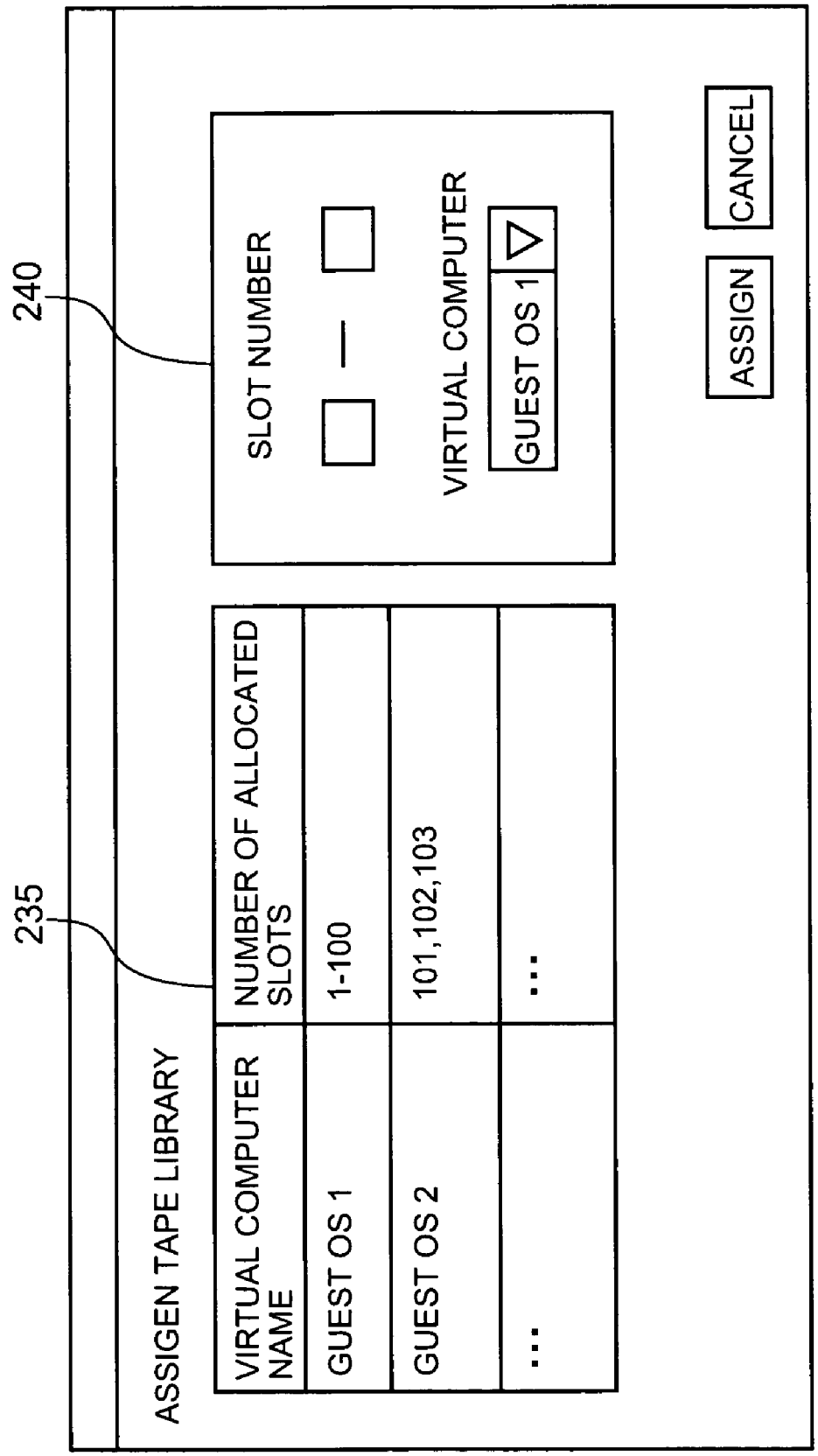

METHOD AND SYSTEM FOR CONTROLLING ACCESS TO TAPE MEDIA FROM A PLURALITY OF VIRTUAL COMPUTERS

CROSS-REFERENCE TO PRIOR APPLICATION

This application relates to and claims priority from Japanese Patent Application No. 2006-200479, filed on Jul. 24, 2006, the entire disclosure of which is incorporated herein by reference.

BACKGROUND

The present invention relates to technology for controlling access to a storage device.

In recent years, for example, storage consolidation has become common, in which storage which used to be provided in dispersed in fashion for each server is concentrated onto a storage system in a single location. Furthermore, configurations have become common in which a file system for providing a file access service utilizing a file transfer protocol such as NFS (Network File System) or CIFS (Common Interface File System) is constructed by mounting a file server in the storage system. In one form of storage consolidation, the Systems Management Department, that provides services such as configuration, application and maintenance in regard to storage in an enterprise, may for example provide for each department a virtual file server by logical division of a single file server.

For data protection reasons, it becomes necessary to provide access control. For example, a virtual file server can access only permitted storage devices. The access control is disclosed in for example Laid-open Japanese Patent Application No. 2004-206221 and Laid-open Japanese Patent Application No. 2000-276406.

In Laid-open Japanese Patent Application No. 2004-206221, a technique for preventing referencing or alteration from other computers is described, in which a partition comprising a tape drive and a plurality of tape slots is created in a tape library, and the tape drive and slot that a host computer can access are restricted by allocating a partition to each host computer.

In Laid-open Japanese Patent Application No. 2000-276406, a technique is disclosed according to which an access allowability table and related table are created and held, and a decision is reached as to whether or not access to a logical volume (LU) is allowed, using the S_ID of an inquiry request from the host computer and these tables. The access allowability table contains, in associated fashion, the N_Port_Name of the host computer or Node_Name and LU in the storage subsystem. The related table relates the S_ID and LU that are allocated when the host computer logs in.

SUMMARY

Hereinbelow, a single computer in hardware terms is referred to as a "host computer" and a virtual host computer obtained by virtually dividing a single host computer is referred to as a "virtual computer". By operating a plurality of virtual computers on a host computer, services identical with the case where a plurality of host computers is operated can be provided on a single host computer (in hardware terms). In association with hardware concentration, this therefore makes it possible to reduce the administrator's hardware administration costs. For example, in a network environment using two file servers, by introducing a single host computer capable of running two virtual computers, and respectively implementing the same settings as the file server on the two virtual computers, said host computer can provide the same services as said two file servers.

A computer system may be envisioned in which a single tape library is shared by a plurality of virtual computers including a first and second virtual computer. In this case, it is considered essential to ensure that the second virtual computer can not use the data that is used by the first virtual computer.

Typically, a host computer and tape library are connected through a SAN (storage area network) and, in the SAN, respective nodes (for example the ports owned by respective host computers or tape libraries) can identify each other by the unique numbers possessed by the nodes. For example, when a SAN is constructed using FC (fiber channel), the host computers and tape libraries connected with the SAN each have a unique identification number called a WWN (World Wide Name). In view of this, access control of a tape library resource from virtual computers may be considered using the techniques disclosed in for example Laid-open Japanese Patent Application No. 2004-206221 and Laid-open Japanese Patent Application No. 2000-276406.

However, the technique disclosed in Laid-open Japanese Patent Application No. 2004-206221 and Laid-open Japanese Patent Application No. 2000-276406 cannot be applied to access control of a tape library resource from a virtual computers. The reason is that the information that is employed for access control in the techniques disclosed in the respective references is the host computer ID and it is not possible to identify the virtual computers on a single host computer using this ID.

An object of the present invention is therefore to control access to a tape library resource by each of the virtual computers.

Further objects of the present invention will become clear from the following description.

A tape library comprises: a plurality of tape media; a plurality of slots in which the plurality of tape media are respectively stored; a plurality of drive in which a tape medium extracted from any of the plurality of slots is set and which read and write data in this tape medium; and a controller by which a tape medium is extracted from a specified slot of the plurality of slots and set in the drive. A host computer according to the present invention comprises: a plurality of virtual computers; a first storage region that stores slot allocation information expressing which slot is allocated to which virtual computer; and an access control unit which specifies the slot allocated to the first virtual computer by referring the slot allocation information, and restricts access from the first virtual computer to the tape medium in the specified slot.

In a first embodiment, there is a plurality of the drives, and the number of the drives is less than the number of the slots. The host computer may further comprise: a second storage region that stores drive condition information expressing which drive is in what condition; and a tape library control unit that finds a drive in a free condition from the plurality of drives by referencing the drive condition information and transmits to the controller a drive setting instruction for extracting the tape medium from the specified slot and setting the tape medium in the drive that has thus been found.

In a second embodiment, the tape library control unit in the first embodiment may issue a prescribed query to the controller, determine from the return value in respect of this query whether or not the controller is available, and transmit the said drive setting instruction if this controller is available.

In a third embodiment, the host computer comprises a host computer that constitutes a cluster with another host computer that accesses the tape library, and, when any of the plurality of virtual computers that are operated by the host computer is down, this virtual computer that is down is restored by the other host computer. In this case, the host computer may further comprise a third storage region that stores the host identifier of the other host computer, and a cluster control unit that copies the slot allocation information to the other host computer identified from the host identifier. In this case, the other host computer may specify the slot that is allocated to the restored virtual computer from the slot allocation information and may control access from the restored virtual computer to the tape medium in the specified slot.

In a fourth embodiment, the host computer in the third embodiment may further comprise a second storage region that stores the drive condition information expressing which drive is in what condition and a tape library control unit that transmits to the controller a drive setting instruction for finding a drive in free condition from the plurality of drives by referencing the drive condition information, extracting the tape medium from the specified slot and setting the tape medium in the drive that has been found. The cluster control unit may also copy the drive condition information to the other host computer. In this case, the other host computer may find a drive that is in a free condition from the plurality of drives by referencing the copied drive condition information, and may transmit to the controller a drive setting instruction for extracting this tape medium from the specified slot and setting this tape medium in the drive that has thus been found, in respect of the virtual computer that has thus been restored.

In a fifth embodiment, the host computer is connected to a back-up computer that manages the respective back-up conditions of the plurality of virtual computers. The access is executed on the occasion of a back-up instruction from the back-up computer. In addition, in this fifth embodiment, for example the back-up computer may transmit the first virtual computer data that requires to be backed up and the specified available drives to the first virtual computer. In this case, the first virtual computer may transmit to the controller a drive setting instruction for extracting the tape medium from the specified slot and setting the tape medium in the drive for the back-up, and may then transmit the back-up instruction to the specified drive.

The various units described above may be implemented by hardware (for example circuitry), a computer program, or a combination of these (for example one or a plurality of CPUs that read and run a computer program). The computer program may be read from a storage resource (for example memory) provided in a computer machine. This storage resource may be installed through a recording medium such as a CD-ROM or DVD (Digital Versatile Disk) or may be downloaded through a communication network such as the Internet or a LAN.

BRIEF DESCRIPTION OF THE DRAWINGS

FIG. 4 shows an example layout of a slot allocation table 90;

FIG. 5 shows an example layout of a drive condition table 85;

FIG. 18 shows an example of a screen interface displayed on a management screen 125.

DESCRIPTION OF THE PREFERRED EMBODIMENTS

Various embodiments of the present invention are described below with reference to the drawings.

Embodiment 1

Figure 1:
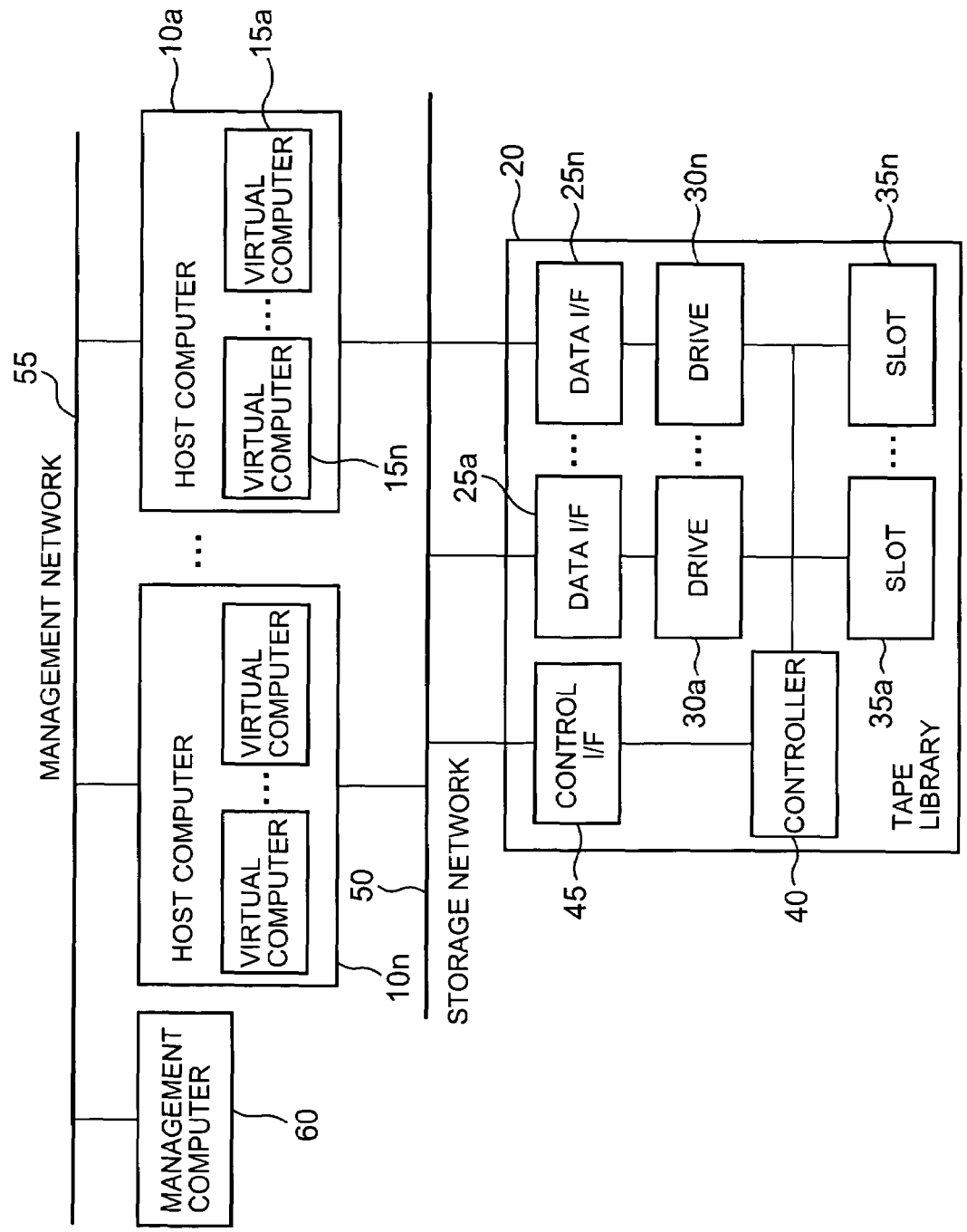
FIG. 1 shows an example layout of a computer system according to a first embodiment of the present invention.

FIG. 1 shows an example layout of a computer system according to a first embodiment of the present invention. In FIG. 1, elements of the same type are given the same main reference numeral and different subsidiary reference numerals. In cases where the description does not distinguish between elements of the same type, the description uses only the main reference numerals: in cases where the description does distinguish between respective elements of the same type, the description uses both the main reference numerals and the subsidiary reference numerals.

One or a plurality of host computers 10a to 10n and a management computer 60 are connected with a management network (for example a LAN (local area network)) 55. The management computer 60 may be dispensed with. In this case, a host computer 10 provides the functionality possessed by the management computer 60.

A host computer 10 capable of running a plurality of virtual computers 15a to 15n and a tape library 20 in which is mounted a plurality of tape media are connected with a storage network (for example a SAN (Storage Area Network)) 50. For example, the host computer 10 may perform as a NAS file server and the virtual computers 15 may perform as virtual file servers.

The tape library 20 comprises drives 30a to 30n for reading data from a tape medium that is set therein or for writing data to this tape medium (hereinbelow expressed as "tape reading/writing") and interfaces (hereinbelow abbreviated to data I/F) 25a to 25n for accessing the drives 30a to 30n. Also, the tape library 20 comprises: a plurality of slots 35a to 35n capable of respectively mounting a plurality of tape media; a controller 40 for extracting a tape medium from a slot 35 and inserting this in the drive 30 or extracting a tape medium from the drive 30 and returning this to a slot 35; and an interface 45 (hereinbelow referred to as a control I/F) for accessing the controller 40.

This tape library 20 is provided with a single data I/F 25 in respect of a single drive 30. Also, a single controller 40 is provided in respect of a plurality of drives. Also, the number of drives 30 may be less than the number of slots 35.

Figure 2:
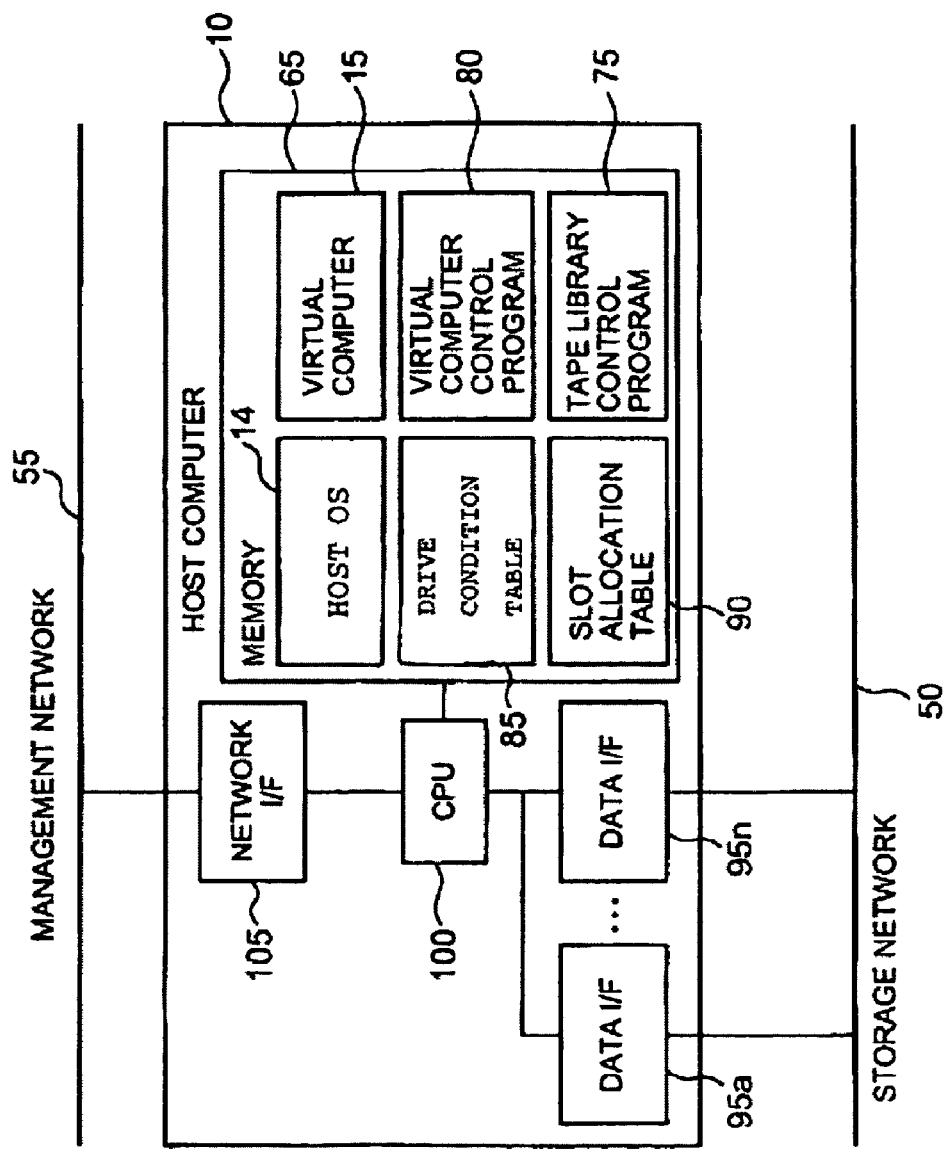
FIG. 2 shows an example layout of a host computer.

FIG. 2 shows an example of the layout of a host computer.

The host computer 10 comprises a memory 65, a CPU 100, data interfaces 95a to 95n (hereinbelow referred to as data I/F 95), and a network interface (hereinbelow referred to as network I/F) 105.

In the memory 65 there are stored a drive condition table 85 that stores the condition of use of each drive 30, a slot allocation table 90 that indicates which slot is allocated to which virtual computer 15, a virtual computer control program 80, a tape library program 75, and a host operating system (hereinbelow referred to as host OS) 14. The virtual computers 15, host OS 14, virtual computer control program 80, and tape library control program 75 are run on the CPU 100. Hereinbelow, in cases where the computer program is used as a grammatical subject, what is actually meant is that processing is performed by the CPU that executes this computer program.

A plurality of virtual computers 15 are run on the host OS 14. In regard to each virtual computer 15, a virtual computer OS (not shown) and a program on the virtual computer OS (hereinbelow referred to as an "application") are executed. For example, when the virtual computer 15 issues an access request to the tape library 20, an access request is issued to the host OS 14 through the virtual computer OS from the application, and the host OS 14 can transmit this access request to the tape library 20.

The host computer 10 can perform such as creation, deletion, start-up and shutting down of each of the virtual computers 15, by executing the virtual computer control program 80. Also, the host computer 10 can control the tape library 20 by executing the tape library control program 75. As the data I/F 15, for example an ATA (Advanced Technology Attachment), SCSI (Small Computer System Interface) or FC are suitable.

Also, the host computer 10 can access the data I/F 25 or control I/F 45 of the tape library 20 through the storage network 50. Examples of tape media that used by the tape library 20 include DDS (Digital Data Storage), DLT (Digital Linear Tape), or LTO (Linear Tape-Open). As the data I/F 25, just as in the case of the data I/F 15, ATA, SCSI or FC are suitable.

Figure 3:
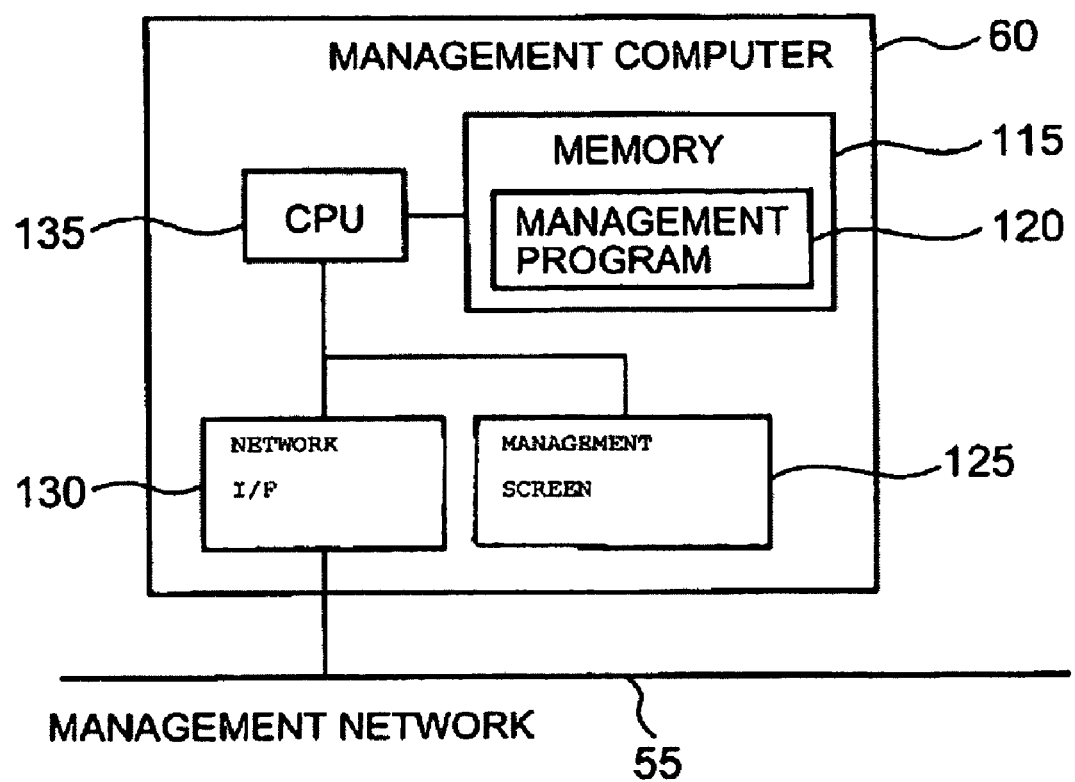
FIG. 3 shows an example layout of a management computer 50.

FIG. 3 shows an example layout of a management computer 60.

A management computer 60 is a computer that manages a host computer 10 that is connected with a management network 55. Specifically, for example, the management computer 60 executes a management program 120 on memory 115 using a CPU 135, and can thereby manage the host computers 10 that are connected with the management network 55 through the network I/F 130. Also, the management computer 60 comprises a management screen 125 (display device) as an interface for use of the management program 120 by an administrator.

FIG. 18 is an example of a screen interface displayed on the management screen 125.

This screen interface is a GUI (Graphical User Interface) and comprises for example a first region 235 and second region 240.

The first region 235 indicates the information recorded in the slot allocation table 90 such as the name of the virtual computer 15 (or another type of identifier may be used), and the name (or another type of identifier may be used) of the slot allocated to the virtual computer 15 in question. The administrator can thereby ascertain which virtual computer 15 is allocated to which slot at the time point displayed, from the information displayed in this region 235.

The second region 240 constitutes an interface for application of a desired slot 15 to the virtual computer 15 desired by the administrator. For example, this second region 240 may comprise a slot number input column and a virtual computer name input column. The administrator can input a desired slot number in the slot number input column. In the virtual computer name input column, there is displayed for example a pull-down form list of available virtual computer names, so the administrator can select the desired virtual computer name from this list. For example, if the button "assign" on the screen interface shown in FIG. 18 is pressed, the virtual computer name that is input by the administrator and the slot number that is input by the administrator are registered in the slot allocation table 90.

FIG. 4 shows an example layout of the slot allocation table 90.

The slot allocation table 90 comprises for example a column 155 in which the name of the virtual computer is written and a column 160 in which the slot number is written. The name of the each virtual computer 15 and the slot number registered for the virtual computer are recorded in the slot allocation table 90. One or more slot numbers can be registered for a single virtual computer name.

FIG. 5 shows an example layout of the drive condition table 85.

The drive condition table 85 comprises for example a column 145 in which an identifier (for example drive name) capable of specifying a drive 30 is written, and a column 150 in which an identifier (for example characters indicating the condition) of the condition of the drive 30 is written. The drive name and condition identifier (hereinbelow simply referred to as "condition") are recorded for each drive 30. The condition may be for example "in use" or "free". If the condition is "in use", the name of the virtual computer using the drive may be added.

Figure 7:
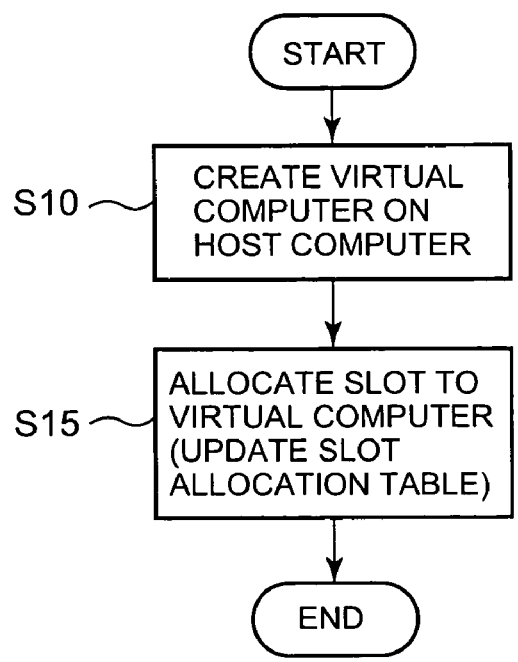
FIG. 7 is a flow chart describing an example of allocation processing procedure in respect of a slot 35 of a virtual computer 15.

FIG. 7 is a flow chart describing an example of the processing procedure whereby a slot 35 is allocated to a virtual computer 15.

For example on a prescribed occasion the virtual computer control program 80 creates a virtual computer 15 (Step S10). Specifically, for example, the virtual computer control program 80 may receive designation of a host computer resource (for example rate of CPU usage and memory capacity) and a virtual computer creation instruction from the administrator and, in response thereto, may create a new virtual computer 15 having the designated host computer resource.

Next, the host OS 14 allocates one or more slot numbers to the virtual computer 15 that has thus been created (S15). Specifically, the host OS 14 registers the name of the virtual computer 15 that has thus been created and the slot number in the slot allocation table 90. Even more specifically, for example the host OS 14 receives from the virtual computer control program 80 the name of the virtual computer 15 that has thus been created, displays this virtual computer name on the screen interface, and, through this screen interface, accepts the slot number that is allocated to the virtual computer having this virtual computer name, and records this virtual computer name and accepted slot number in the slot allocation table 90.

It should be noted that the slot allocated to the virtual computer 15 may be a slot that is not used by another virtual computer 15 or may be a slot that is used by another virtual computer 15. In other words, the host OS 14 may control such that a single slot is only allocated to a single virtual computer or such that a single slot can be shared by a plurality of virtual computers 15.

Figure 8:
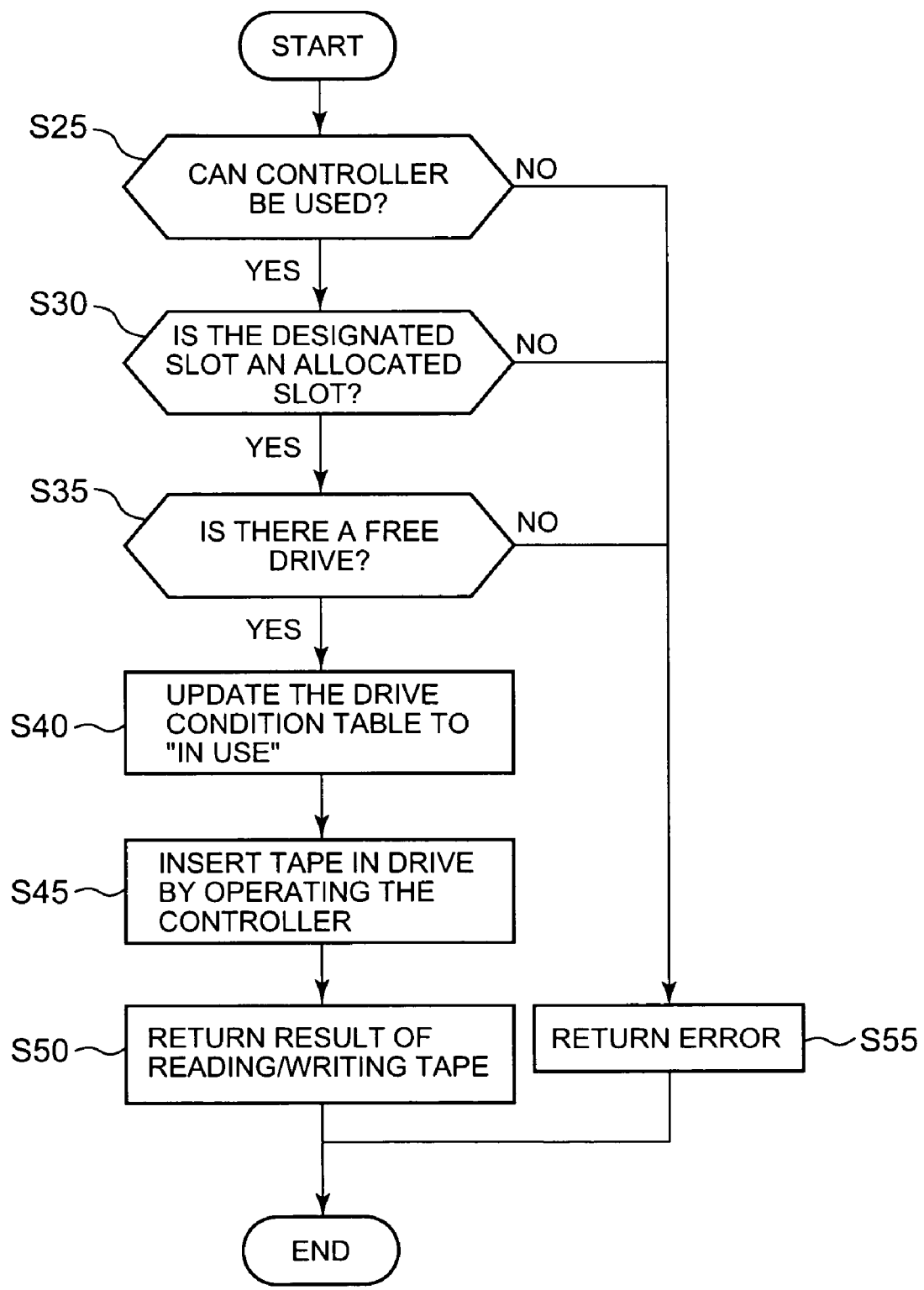
FIG. 8 is a flow chart describing an example of processing procedure for reading data.

FIG. 8 is a flow chart describing an example of processing procedure for reading/writing data. In the following description, the virtual computer that performs reading/writing of data onto a tape medium is called the "target virtual computer".

A decision as to whether or not the controller 40 is usable is made (S25). Specifically, for example, the host OS 14, having received a slot instruction from the target virtual computer 15, issues a query to the control I/F 45 and, depending on the return value from the control I/F 45, the OS 14 can decide whether or not the controller 40 is available. If the controller 40 is not available (S25: No), the host OS 14 returns (S55) an error to the target virtual computer 15.

If the controller 40 is available (S25: yes), the host OS 14 refers to the slot allocation table 90 ascertains whether the designated slot number is associated with the name of the target virtual computer 15(S30). Thereupon, when for example designation of a slot number is received from the target virtual computer 15, the "designated slot" can be taken as the slot corresponding to this slot number. Also, when for example designation of a LUN (logical unit number) is received from the target virtual computer 15, this can be taken as the slot where a tape medium is stored that provides the LU (logical volume) having this LUN. In this case, for example, a table is provided in which slot numbers are associated with LUNs, and the host OS 14 can thus specify a slot number corresponding to a LUN in an access request by referencing this table.

If the designated slot number is not associated with the name of a target virtual computer 15 (S30: No), the host OS 14 executes step S55 described above. On the other hand, if the designated slot number is in fact associated with the name of a target virtual computer 15 (S30: yes), the host OS 14 refers to the drive condition table 85, and determines whether or not there exists a available drive (specifically, for example, a drive whose condition is "free") (S35).

If there are not available devices (S35: No), the host OS 14 executes S55 described above. On the other hand, if an available drive is specified (S35: Yes), the host OS 14 updates the condition of the specified drive to "in use" (i.e. it updates the drive condition table 85) (S40). By passing through these steps, it is possible to prevent wrongful use of a drive which is used by another virtual computer 15. When S40 is finished, the host OS 14 can issue the name of the specified drive to the target virtual computer 15.

Next, the target virtual computer 15 executes the tape library control program 75, and operates the controller 40 through the controller I/F 45 to insert the tape medium stored in the designated slot 35 to the said specified drive 30 (S45).

Finally, the target virtual computer 15 accesses this drive 30, reads/writes data to the tape and gets the result (S50).

The above description relates to the first embodiment. With this first embodiment, by allocating a slot to each virtual computer 15, this virtual computer can only access the tape medium in the respective allocated slot. Then it is possible to prevent another virtual computer 15 from accessing this tape medium.

It should be noted that access control in this first embodiment could not be achieved merely by adopting the techniques disclosed in Laid-open Japanese Patent Application No. 2004-206221 and Laid-open Japanese Patent Application No. 2000-276406 referred to above. Specifically, it cannot be achieved merely by replacing the "host computer identifier" as "virtual computer identifier" and replacing the partition or logical volume identifier as a slot identifier. In this first embodiment, design measures are taken based on the construction of the tape library 20.

First of all, a storage system in which a plurality of hard disks are arranged and the tape library 20 are respectively of different construction. The tape library 20, apart from the slots 35, comprises drives 30 and the drives 30 are identified as devices by the virtual computers 15, not the slots 35. If a storage system were adopted, what would be identified as a device by the virtual computer would in fact be an LU. Mere substitution would therefore result in drive identifiers being used instead of LUNs.

Also, the tape library 20 comprises a controller 40 separate from a drive 30 and a controller 40 ejects or inserts a tape medium in the drive 30 from the slot 35. The controller 40 is shared by a plurality of virtual computers 15. It is therefore not possible merely to adopt the technology of Laid-open Japanese Patent Application No. 2004-206221. Also, if the technology of Laid-open Japanese Patent Application No. 2004-206221 were to be used, the drives 30 that could be used by the virtual computers 15 would be restricted. Consequently, the number of virtual computers 15 would depend on the number of drives 30 mounted in the tape library 20. In contrast, in this first embodiment, it is the slot that is allocated to a virtual computer 15, and the drive 30 is not allocated. The drive 30 is used in time divided fashion (specifically, depending on whether its condition is "free" or "in use") by a plurality of virtual computers 15. It is therefore possible to protect the data of the virtual computers 15 even in an environment in which the controller 40 and/or drives 30 are shared by a plurality of virtual computers 15, and it is possible to arrange that the number of virtual computers 15 does not depend on the number of drives 30.

Embodiment 2

The virtual computers 15 can store data (for example files) on a storage resource that is allocated to the virtual computer 15 and back up this data to the tape library 20. In a second embodiment, a back-up server controls a back-up sequence.

Figure 9:
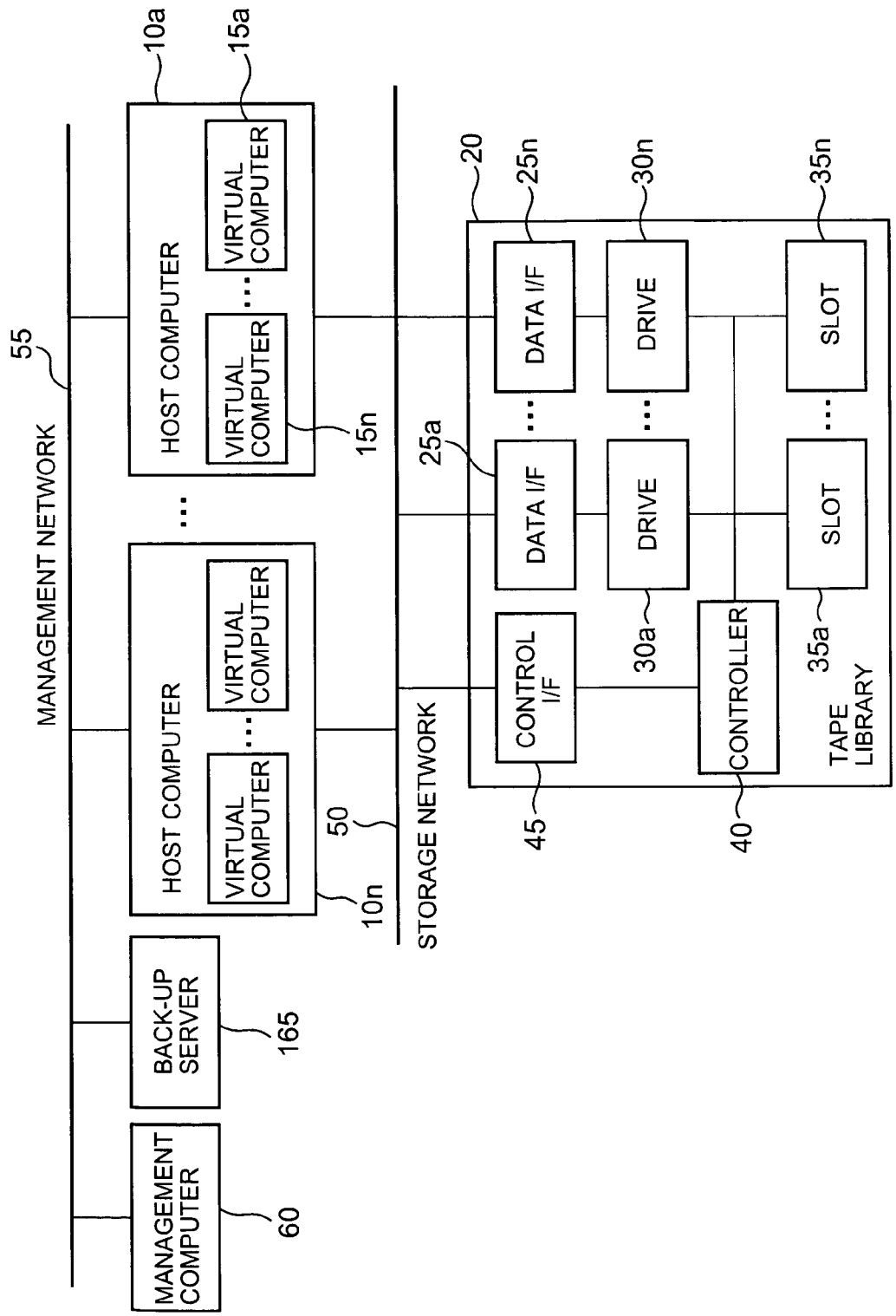
FIG. 9 shows an example layout of a computer system according to a second embodiment of the present invention.

FIG. 9 shows an example layout of a computer system according to the second embodiment of the present invention. The following description will focus on aspects of difference with respect to the first embodiment, description of aspects that are shared with the first embodiment being omitted or abbreviated.

This computer system is a system wherein a back-up server 165 is provided that manages the data or a back-up schedule in the computer system (see FIG. 1) according to the first embodiment.

Figure 10:
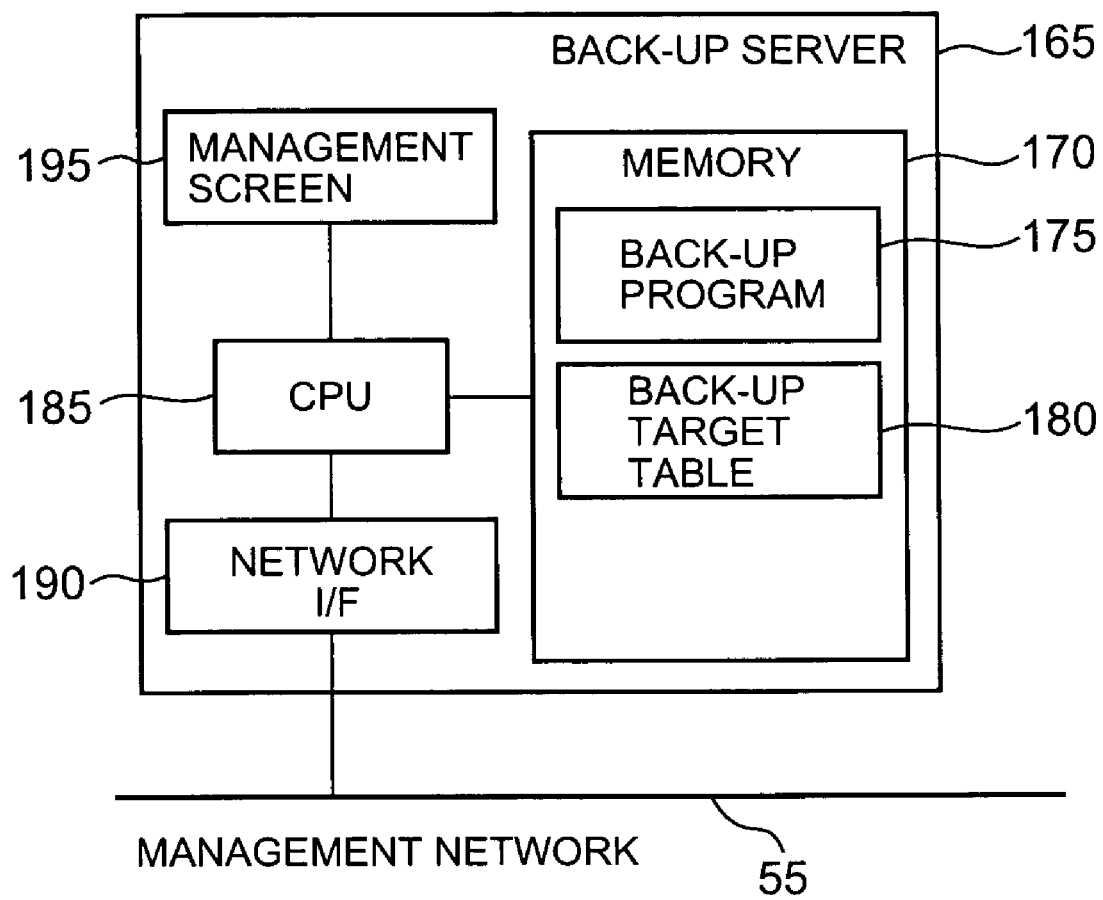
FIG. 10 shows an example layout of a back-up server 165.

FIG. 10 shows an example layout of a back-up server 165.

A back-up server 165 comprises a memory 170, a CPU 185, a management screen 195 (display device) and a network I/F 190. The memory 170 stores for example a back-up program 175, a table 180 of subjects of back-up and a tape library control program 75.

In the back-up server 165, the CPU 185 executes the back-up program 175 stored in the memory 170. The back-up program 175 specifies the drive 30 to be used for back-up and the data to be back-up, specifies virtual computers and host computers that are listed in the back-up target table 180, then controls the targets to execute back-up using the drive 30 and the data. The administrator can execute the back-up program using the management screen 195 (display device).

Figure 11:
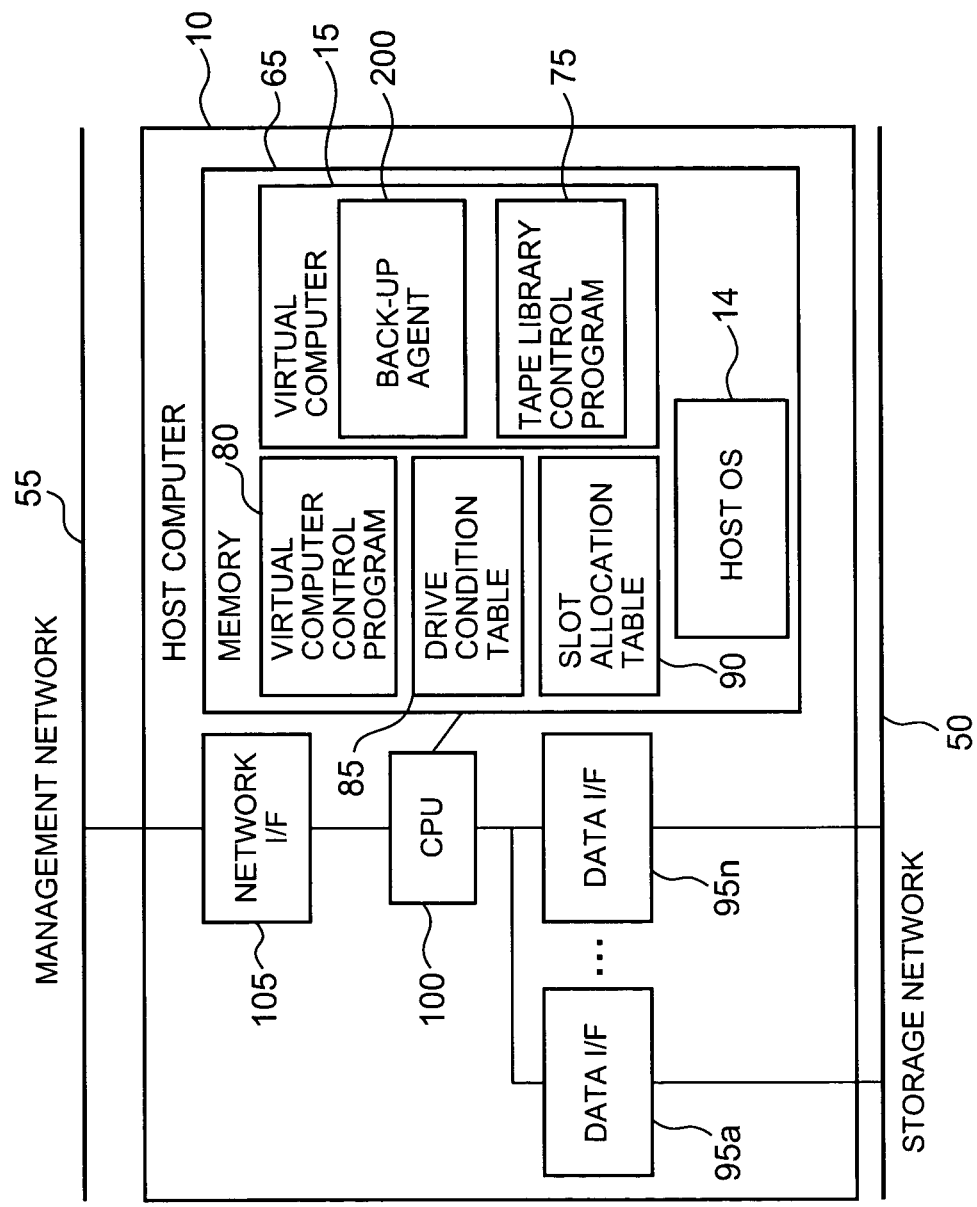
FIG. 11 shows an example layout of a host computer 10 according to the second embodiment.

FIG. 11 is an example layout of a host computer 10 according to the second embodiment.

A virtual computer control program 80 and virtual computer 15 are operated on the host computer 10. A back-up agent 200 that executes back-up and the tape library control program 75 are operated on the virtual computer 15 on receipt of instructions from the back-up program 175.

Figure 12:
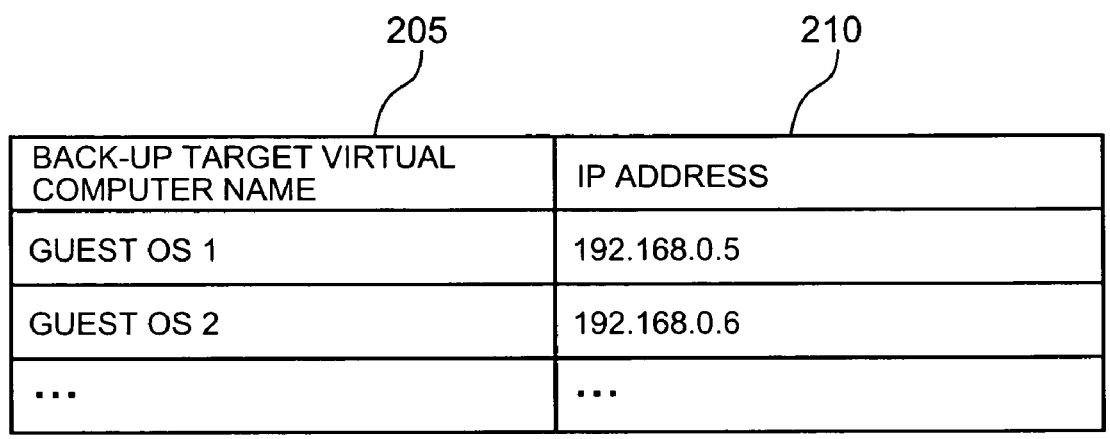
FIG. 12 shows an example layout of a table 180 indicating the back-up target.

FIG. 12 is an example layout of the back-up subject table 180.

The back-up target table 180 comprises a column 205 in which is written the identifier (for example name) of a virtual computer that is the back-up target, and a column 210 in which is written an identifier (for example IP (internet protocol) address) for communication with this virtual computer through the management network 55. The virtual computer name and IP address are recorded for each virtual computer that is the back-up target. The back-up program 175 identifies a virtual computer that is to be the subject of back-up by referring to the back-up target table 180, and gives instructions for back-up to this specified virtual computer. As the protocol between the back-up program 175 and the back-up agent 200, NDMP (Network Data Management Protocol) may be adopted.

Figure 13:
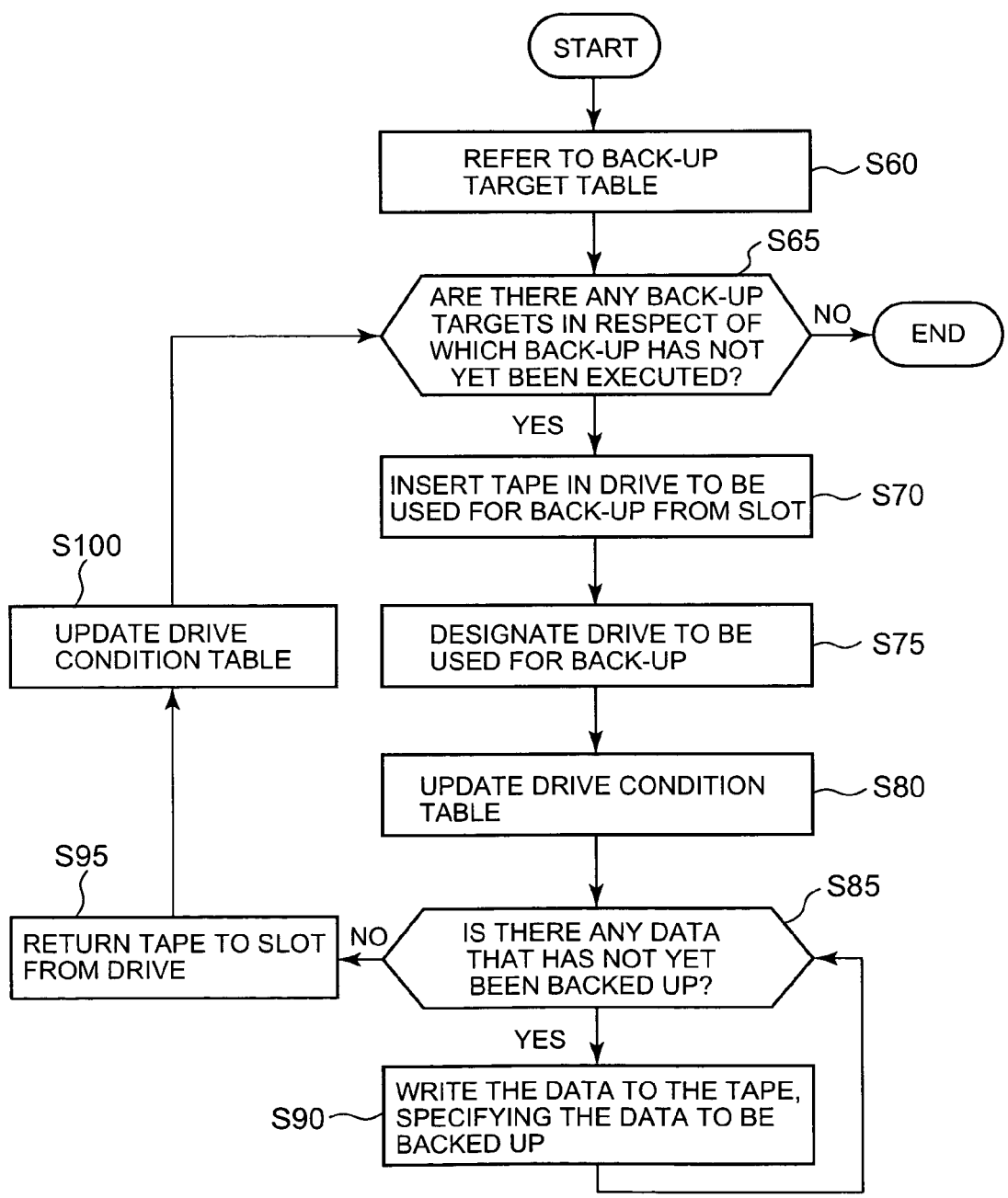
FIG. 13 is a flow chart showing an example of back-up procedure.

FIG. 13 is a flow chart showing an example of back-up procedure.

For example, the administrator gives an instruction for starting up the back-up program 175 through the management screen 195 of the back-up server 165. The back-up program 175 that is started up by this instruction specifies the virtual computer that is to be the back-up target, by referencing the back-up target table 180 (S60).

Next, of the virtual computers that may be the back-up target, the back-up program 175 checks to ascertain whether there are any virtual computers in respect of which back-up has not yet been performed (S65). For example, in S65, the back-up program 175 may perform a check to establish whether there are any virtual computers in respect of which back-up has not been performed by inquiring of the virtual computers 15 whether or not back-up has been completed after updating of data, from the response to this inquiry. If, in S65, it is concluded that there are no virtual computers in respect of which back-up has not yet been performed (S65: No) i.e. that back-up has been performed in respect of all of the target virtual computers, the back-up program 175 terminates processing. A message to the effect that back-up has been completed is then delivered to the administrator via the management screen 195.

On the other hand, if the back-up program 175 finds that one or more virtual computers have not yet been backed up (S65: Yes), the back-up program 175 executes the tape library control program 75 of a virtual computer 15 selected from these one or more virtual computers (hereinbelow referred to as selected virtual computer). The tape medium to be used for back-up is thereby extracted from the slot 35, and this tape medium is inserted into the drive 30 that is to be used in back-up (S70).

The slot in S70 is one of the slots allocated to the selected virtual computer 15, and the slot has the tape medium that has a free region. Specifically, in the event of back-up, data is written in sequence from the free region of the data medium that is inserted in the slot of lowest number. During this process, termination of writing of the data to be backed up occurs at some intermediate point before the end of a given data medium. In this case, on the occasion of the next back-up, the data that is to be written in the next back-up is written from this intermediate point. The data that is then the back-up target may be all the data managed by the storage resource of the selected virtual computer, or may be the data representing the difference from the data that was backed up on the previous occasion. In the latter case, the virtual computer manages the difference produced by updating when the data in its own storage resource was updated after back-up; when performing back-up on the next occasion, it suffices to perform back-up solely of the difference that is thus managed. In this second embodiment, for example, management is effected by the slot allocation table 90 (or back-up target table 180) in terms of the identity of the location (for example address) up to which data is stored in the data medium of a slot, and the identity of this slot, and, by referencing this table, the tape library control program 75 may specify from what point back-up should be commenced.

The drive in S70 is for example a drive specified as "free" from the drive condition table 85 by the tape library control program 75. The name of the specified drive may then be communicated to the back-up program 175 by the tape library control program 75.

Next, the back-up program 175 designates the drive to be used for back-up with regard to the back-up agent 200 operated by the selected virtual computer 15. Specifically, for example, the back-up program 175 notifies the back-up agent 200 of the specified drive name (S75).

Next, the back-up agent 200 commissions the host OS 14 with updating of the drive condition table 85 and the host OS 14 updates the drive condition table 85 (i.e. sets the condition of the specified drive to "in use") (S80).

Next, the back-up program 175 checks to ascertain whether there is any data that should be backed up but has not yet been backed up to (S85). If there is data that has not yet been backed up (S85: Yes), the back-up program 175 designates the data that should be backed up to the back-up agent 200 and the back-up agent 200 writes this data onto a tape medium through the designated drive (S90). For example the filename or file system name is suitable as the identifier designating the data to be backed up. Also, for example the files that have been backed up are communicated by the back-up agent 200 to the back-up program 175 so that the back-up program 175 can identify whether there are any data that have not yet been backed up by deleting the file names from the back-up list. This back-up list is acquired from the selected virtual computer 15 for example by interrogating the selected virtual computer 15.

If there are no data that have not yet been backed up i.e. if all the data that should be backed up have in fact been backed up (S85: No), the back-up program 175 executes the tape library control program 75 to extract the tape medium from the drive 30 and return this tape medium to its original slot 35 (S95).

The back-up agent 200 then notifies the host OS 14 that use of the drive 30 has now been terminated, and the host OS 14 returns the condition of this drive 30 from "in use" to "free" (S100). After this, S65 is again performed.

The processing of S70, S85 and S90 described above may be in accordance with the NDMP procedure set out in for example http://www.ndmp.org/download/sdk_v4/draft-skardal-ndmp4-04.txt.

With this second embodiment, a virtual computer 15 can back-up data to the tape library 20 in response to an instruction from the back-up server 165. The tape medium representing the back-up destination on this occasion is constituted by the tape medium accommodated in the slot that is allocated to this virtual computer 15. It is therefore possible to prevent the data of another virtual computer 15 from being backed up onto the tape medium where the data of the virtual computer 15 is stored when tape back-up is performed.

Embodiment 3

For example, if file servers are used with the object of storage consolidation, a cluster may often be constituted by a plurality of servers. If a cluster is constituted, even if a fault occurs in one of the file servers, the file access service can be continued by the other file servers constituted the cluster, so usability of the file servers can be improved.

Accordingly, in this third embodiment, a computer system is constructed with improved usability of the virtual computers by constituting a plurality of host computers as a cluster. Hereinbelow, a method is described by way of example whereby access control to the slot can be achieved effectively, even after fail-over of a virtual computer operating on a first host computer onto a second host computer.

Figure 14:
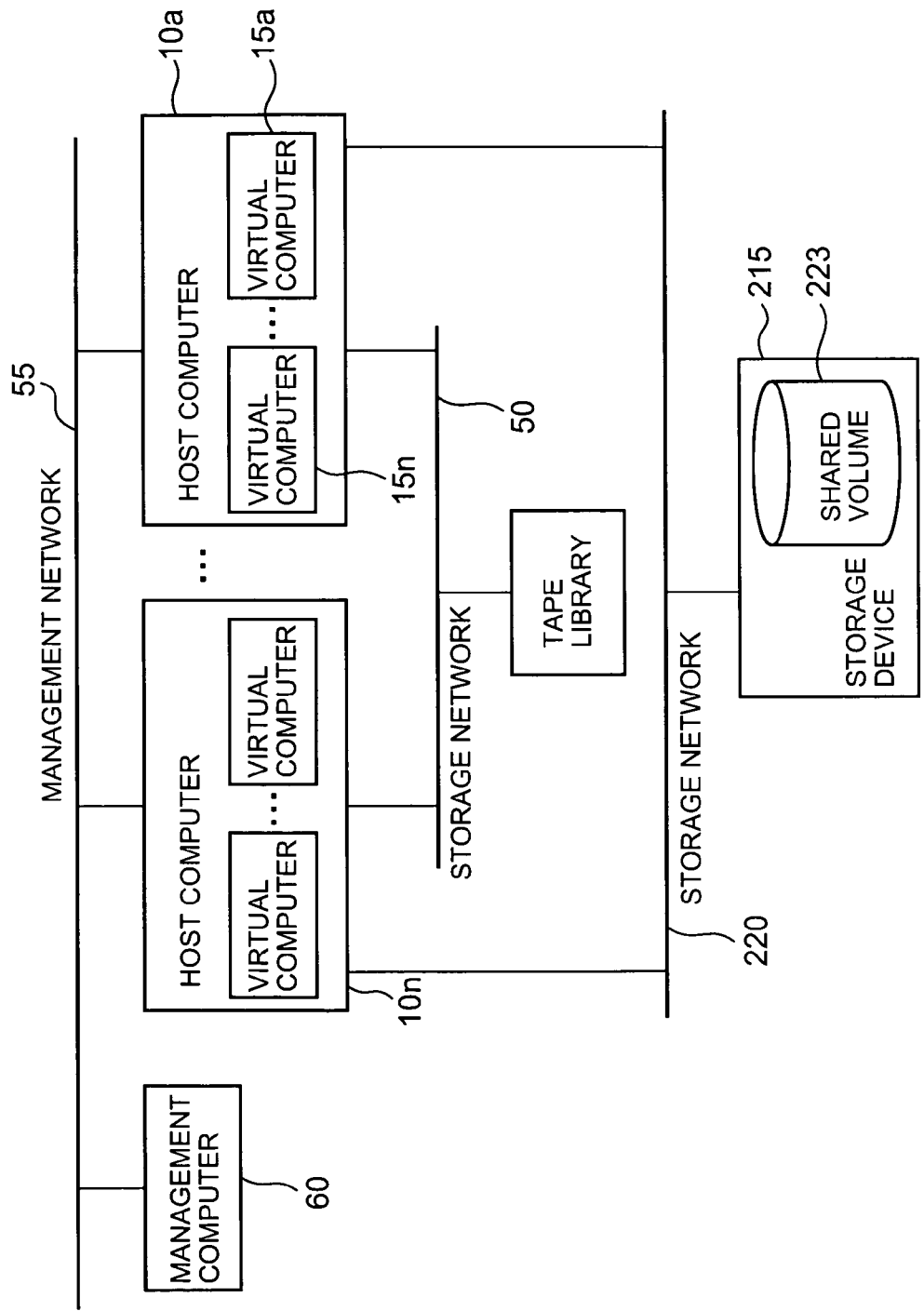
FIG. 14 shows an example layout of a computer system according to a third embodiment.

FIG. 14 shows an example of the layout of a computer system according to the third embodiment of the present invention.

In this computer system, a storage device 215 is connected with a further storage network 220. The storage network 220 performs communication with a protocol conforming to for example SCSI or FC. A plurality of host computers 10a to 10n are connected with this storage network 220; each host computer 10 can access a shared volume 223 provided by a storage device 215. The shared volume 223 is a logical volume that is shared by a plurality of host computers 10. Data in the shared volume 223 can be referenced and updated by a plurality of host computers 10. In this third embodiment, in the shared volume 223, there are stored for example data required for generating virtual computers 15 such as for example a virtual computer OS or computer programs executed on the virtual OS.

Figure 15:
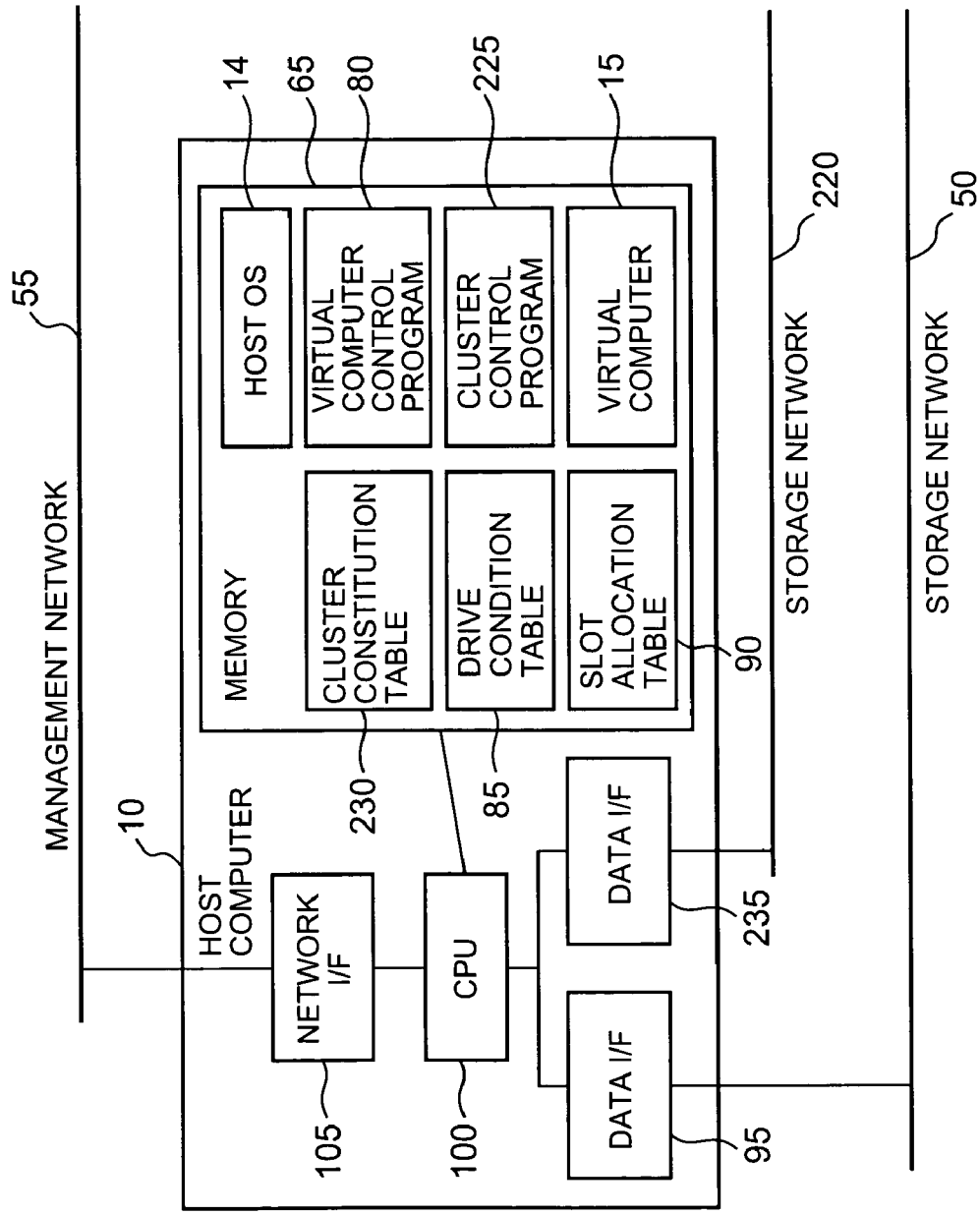
FIG. 15 shows an example layout of a host computer 10 according to a third embodiment.

FIG. 15 shows an example of the construction of a host computer 10 according to the third embodiment.

The host computers 10 shown in FIG. 2 further comprise a data interface 235 for exchange of data with the storage device 215, a cluster control program 225 and a cluster constitution table 230. Commands, libraries and data for operating the virtual computers 15 are stored in the shared volume 223 and, in addition, the host computers 10a to 10n are each connected with the shared volume 223. Consequently, no matter on which host computer 10 memory the virtual computer 15 is indicated, it can be updated and operated by referencing the shared volume 223.

The cluster control program 225 can specify host computers 10 (hereinbelow referred to as remote cluster hosts) that constitute a cluster by referring to the cluster constitution table 230, and implement for example instructions such as copying, start-up or shutdown of files, or fail-over of a virtual computer in respect of a remote cluster host 10 through the management network 55.

Figure 16:
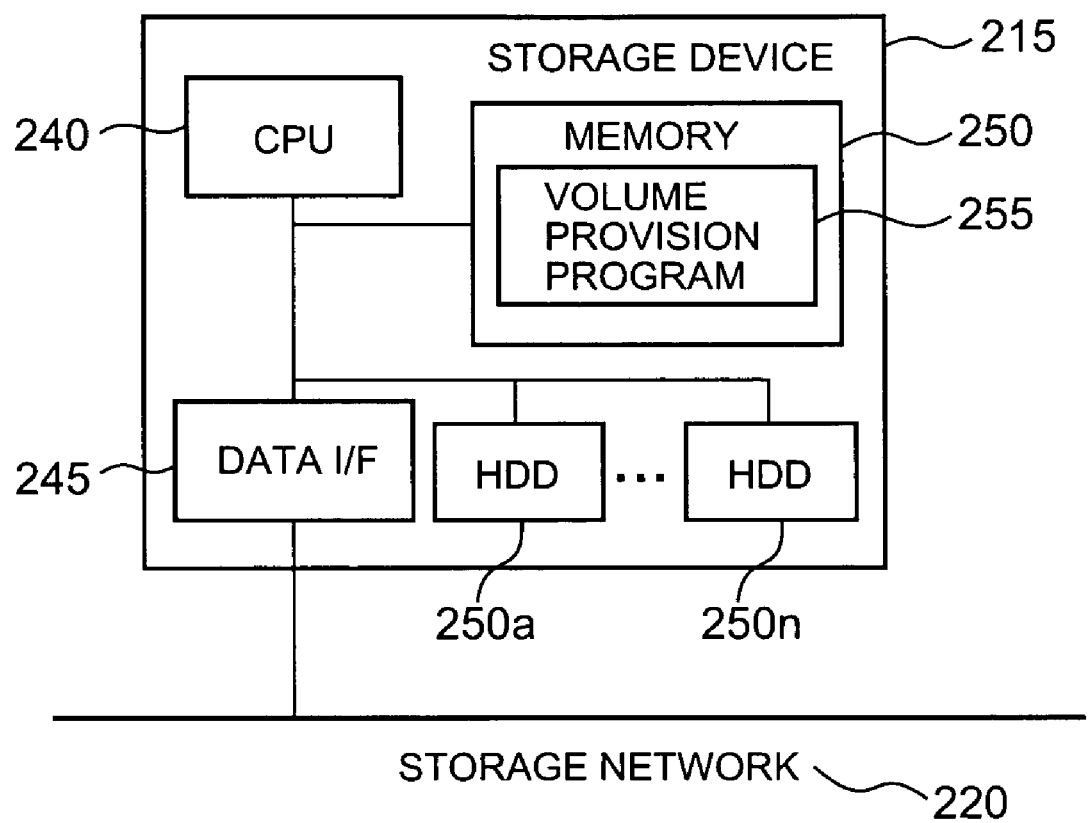
FIG. 16 shows an example layout of a storage device 215.

FIG. 16 shows an example layout of a storage device 215.

The storage device 215 comprises a memory 250, CPU 240, a data interface (data I/F) 245 and hard disk drives (HDD) 250a to 250n. A volume provision program 255 is stored on the memory 65.

The volume provision program 255 can provide a volume using a single HDD, or a logical storage region on a plurality of HDDs constituting a RAID (Redundant Array of Independent Inexpensive discs). The host computer 10 can access the logical volume provided by the volume provision program 225 through the data I/F 245.

Figure 6:
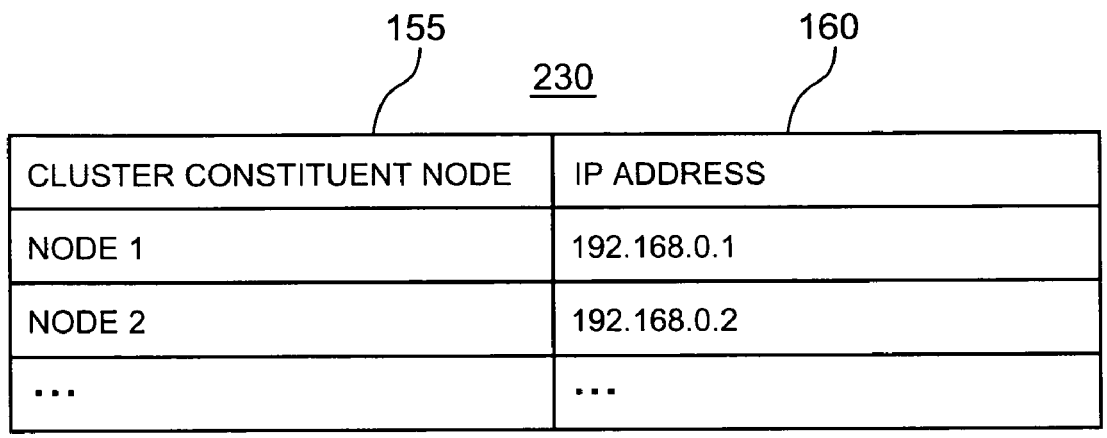
FIG. 6 shows an example layout of a cluster composition table 230.

FIG. 6 is an example layout of a cluster constitution table 230.

The cluster constitution table 230 comprises a column 155 in which is written an identifier (for example node name) capable of specifying a remote cluster host, and a column 160 in which is written the address (for example IP address) for communicating with the remote cluster host. The identifier and address are recorded for each remote cluster host constituting the cluster and for each host computer 10 comprised in this cluster constitution table 230.

Figure 17:
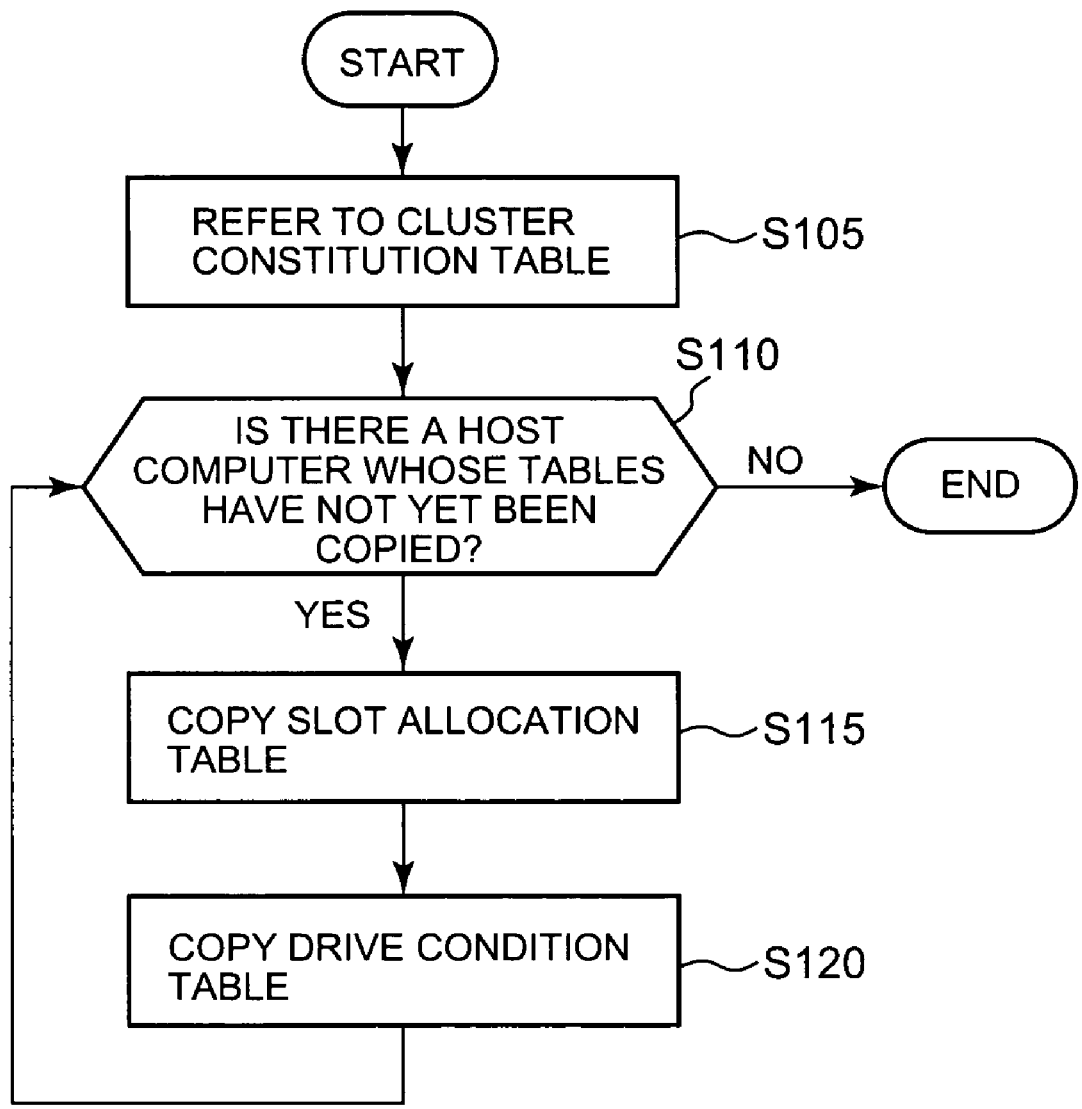
FIG. 17 is a flow chart showing an example of the procedure for copying the slot allocation table 90 and drive condition table 85 to a remote cluster host.

FIG. 17 is a flow chart illustrating an example of the procedure for copying a slot allocation table 90 and drive condition table 85 to a remote cluster host.

This procedure is commenced when updating of the slot allocation table 90 or drive condition table 85 is generated.

Initially, the cluster control program 225 specifies a remote cluster host by referencing the cluster constitution table 230 (S105).

Next, the cluster remote program 225 checks whether there are any remote cluster hosts in the remote cluster hosts specified in S105 whose table 85 and 90 have not yet been copied (S110). This can be achieved by setting a temporary flag in the remote cluster host to indicate that copying has been completed every time that the tables 85 and 90 are copied. If there are no remote cluster hosts whose tables 85 and 90 have not yet been copied i.e. if the tables of all the remote cluster hosts have been copied (S110: NO), processing by the cluster control program 225 is terminated.

If there is one or more remote cluster host whose tables have not yet been copied (S110: YES), the cluster control program 225 copies the slot allocation table 90 to a remote cluster host selected from this one or more remote cluster hosts (S115), and then copies the drive condition table 90 (S120). For the copying, for example ftp (File Transfer Protocol) or ssh (Secure Shell) is suitable.

The slot allocation table 90 and drive condition table 85 can be copied to a remote cluster host by the above procedure.

In this third embodiment, when fail-over of a virtual computer takes place from a first host computer to a second host computer, access to the tape medium by the virtual computer running on the second host computer can be controlled in accordance with the slot allocation table 90 and drive condition table 85 of the copy destination.

Specifically, for example the host OS (hereinbelow referred to as the first OS) of the first host computer monitors the virtual computers running on this first host OS. In this way, the first host OS detects that a given virtual computer is down. If this first host OS detects that a given virtual computer is down, this first host OS specifies a remote cluster host from the cluster constitution table 230 and reports the identifier (for example name) of the virtual computer that has gone down to the host OS (hereinbelow referred to as the second host OS) of the remote cluster host that was thus specified. The second host OS reads from the shared volume 223 the data associated with the identifier that has been reported to it, and, in accordance with this data (for example OS of the virtual computer that went down) that has thus been read, generates a virtual computer having the identifier that has thus been reported to it. Fail-over of the virtual computer is thereby completed. After this, if the virtual computer that has been restored by this fail-over process accesses the tape medium, access by this virtual computer can be controlled in accordance with the slot allocation table 90 and drive condition table 85 that were copied as described above.

While various embodiments of the present invention have been described above, these embodiments merely serve to describe the present invention by way of example and the scope of the present invention is not intended to be restricted solely to these embodiments. The present invention can be put into practice in various other modes without departing from its essence. For example, other types of storage resource (such as for example a hard disk) may be adopted in place of or in addition to the memory provided in the host computers, management computer and back-up server. Also, the second and third embodiments may be combined.

What is claimed is:

1. A host computer that accesses a tape library, the tape library comprising:
   a plurality of tape media;
   a plurality of slots in which the plurality of tape media are respectively stored;
   a drive in which a tape medium, among the plurality of the tape media, that has been extracted from any of the plurality of slots is set and which performs reading or writing of data in response to the setting of the tape medium; and
   a controller by which the tape medium is extracted from a designated slot among the plurality of slots and set in the drive;
   the host computer comprising:
   a plurality of virtual computers;
   a first storage region that stores slot allocation information expressing which slot, among the plurality of the slots, is allocated to which virtual computer; and
   an access control unit for specifying a slot that is allocated to a first virtual computer among the plurality of virtual computers based on the slot allocation information and for restricting access from the first virtual computer to a specified tape medium, among the plurality of the tape media, stored in the specified slot,
   wherein the host computer constitutes a cluster with another host computer that accesses the tape library, and, when any of the plurality of virtual computers that are operated by the host computer is down, the virtual computer that is down is restored by the other host computer,
   the host computer flirt her comprising:
   a third storage region that stores a host identifier of the other host computer; and
   a cluster control unit that copies the slot allocation information to the other host computer identified from the host identifier.

2. The host computer according to claim 1, wherein the tape library comprises a plurality of the drives, a number of the drives being less than a number of the slots,
   the host computer further comprising:
   a second storage region that stores drive condition information expressing which drive is in what condition; and
   a tape library control unit that finds a specific drive in a free condition among the plurality of drives by referencing the drive condition information and transmits to the controller a drive setting instruction for extracting the specified tape medium from the specified slot and setting the specified tape medium in the specific drive.

3. The host computer according to claim 2, wherein the tape library control unit issues a prescribed query to the controller, determines from a return value in response to the query whether or not the controller can be used, and transmits the drive setting instruction if the controller is identified as being usable.

4. The host computer according to claim 1, further comprising:
   a second storage region that stores drive condition information expressing which drive is in what condition; and
   a tape library control unit that transmits to the controller a drive setting instruction for finding a drive in free condition from the plurality of drives by referencing the drive condition information, and for extracting the specified tape medium from the specified slot and for setting the specified tape medium in the drive found by the tape library control unit,
   wherein the cluster control unit copies the drive condition information to the other host computer.

5. The host computer according to claim 1, wherein the host computer is connected to a back-up computer that manages respective back-up conditions of the plurality of virtual computers, and
   access is executed in response to a back-up instruction from the back-up computer.

6. The host computer according to claim 1, wherein the plurality of the virtual computers are executed on a single processor.

7. The host computer according to claim 1, wherein the host computer further comprises an allocation unit which allocates at least one slot, among the plurality of the slots, to each of the plurality of the virtual computers.

8. A method of controlling access to a tape library, the tape library comprising:
   a plurality of tape media;
   a plurality of slots in which the plurality of tape media are respectively stored;
   a drive in which a tape medium, among the plurality of the tape media, that has been extracted from any of the plurality of slots is set and which performs reading or writing of data in response to the setting of the tape medium; and
   a controller by which the tape medium is extracted from a designated slot among the plurality of slots and set in the drive;
   the method comprising:
   a first virtual computer of a plurality of virtual computers running on a single host computer designates an access target,
   a slot that is allocated to the first virtual computer is specified from slot allocation information expressing which slot, among the plurality of the slots, is allocated to which virtual computer of the plurality of virtual computers, and
   access from the first virtual computer is restricted to a specified tape medium, among the plurality of the tape media, stored in the specified slot,
   wherein a cluster is constituted by the host computer and another host computer that accesses the tape library,
   the slot allocation information is copied from the host computer to the other host computer,
   when any of the plurality of virtual computers that are operated by the host computer is down, the virtual computer that is down is restored by the other host computer,
   the slot that is allocated to the virtual computer that has been restored is specified from the copied slot allocation information, and access from the virtual computer that has been restored is restricted to the tape medium in the specified slot.

9. The method of controlling access according to claim 8, wherein the tape library comprises a plurality of the drives, a number of the drives being less than a number of the slots,
   a specific drive in a free condition is found among the plurality of drives by referencing drive condition information expressing which drive is in what condition, and
   a drive setting instruction for extracting the specified tape medium from the specified slot and setting the specified tape medium in the specific drive is transmitted to the controller.

10. The method of controlling access according to claim 9, wherein a prescribed query is issued to the controller, determination is made from a return value in response to the query whether or not the controller can be used, and the drive setting instruction is transmitted if the controller is identified as being usable.

11. The method of controlling access according to claim 8, wherein
a plurality of the drives are present,
drive condition information expressing which drive is in what condition is stored,
a drive setting instruction for finding a drive in free condition from the plurality of drives by referencing the drive condition information, for extracting the specified tape medium from the specified slot and for setting the specified tape medium in the drive that has been found, is transmitted to the controller,
the drive condition information is copied to the other host computer from the host computer, and
a drive setting instruction for finding a drive in free condition from the plurality of drives by referencing the copied drive condition information, extracting the specified tape medium from the specified slot and setting the specified tape medium in the drive that has thus been found, in response to the virtual computer that has thus been restored, is transmitted to the controller.

12. The method of controlling access according to claim 8, wherein a back-up computer that manages respective back-up conditions of the plurality of virtual computers transmits a back-up instruction to the first virtual computer that requires back-up, among the plurality of virtual computers, and
the first virtual computer executes access in response to the back-up instruction received from the back-up computer.

13. The method of controlling access according to claim 12, wherein
a plurality of the drives are present;
a drive in free condition is found from the plurality of drives by referencing drive condition information that expresses which drive is in what condition;
the back-up computer transmits to the first virtual computer the back-up instruction designating data that requires to be backed up of a plurality of data items managed by the first virtual computer, and the drive that has been found; and
the first virtual computer transmits to the controller a drive setting instruction for extracting the specified tape medium from the specified slot and setting the specified tape medium in the drive designated by the back-up instruction, and transmits, to the designated drive, the data designated by the back-up instruction.

14. The method according to claim 8, further comprising:
executing the plurality of the virtual computers on a single processor.

15. A computer system, comprising:
a tape library; and
a host computer,
the tape library, comprising:
a plurality of tape media;
a plurality of slots in which the plurality of tape media are respectively stored;
a drive in which a tape medium, among the plurality of the tape media, that has been extracted from any of the plurality of slots is set and which performs reading or writing of data in response to the setting of the tape medium; and
a controller by which the tape medium is extracted from a designated slot among the plurality of slots and set in the drive;
the host computer, comprising:
a plurality of virtual computers;
a first storage region that stores slot allocation information expressing which slot, among the plurality of the slots, is allocated to which virtual computer; and
an access control unit for specifying a slot that is allocated to a first virtual computer among the plurality of virtual computers based on the slot allocation information and which restricts access from the first virtual computer to a specified tape medium, among the plurality of the tape media, stored in the specified slot,
wherein the host computer is included in a cluster with another host computer that accesses the tape library, and, when any of the plurality of virtual computers that are operated by the host computer is down, the virtual computer that is down is restored by the other host computer in the cluster,
the host computer further comprising:
a third storage region that stores a host identifier of the other host computer; and
a cluster control unit that copies the slot allocation information to the other host computer identified based on the host identifier.

16. The computer system according to claim 15, wherein the host computer further comprises:
a second storage region that stores drive condition information expressing which drive is in what condition; and
a tape library control unit that transmits to the controller a drive setting instruction for finding a drive in free condition from the plurality of drives by referencing the drive condition information, and for extracting the specified tape medium from the specified slot and for setting the specified tape medium in the drive found by the tape library control unit,
wherein the cluster control unit copies the drive condition information to the other host computer.

17. The computer system according to claim 15, wherein the plurality of the virtual computers are executed on a single processor.

* * * * *